(12) United States Patent
Chang

(10) Patent No.: US 7,604,194 B2
(45) Date of Patent: Oct. 20, 2009

(54) STRUCTURE OF A SINGLE-PULL REEL

(75) Inventor: Wen-Han Chang, Taipei (TW)

(73) Assignee: Acrox Technologies Co., Ltd., Taipei City (TW)

( * ) Notice: Subject to any disclaimer, the term of this patent is extended or adjusted under 35 U.S.C. 154(b) by 0 days.

(21) Appl. No.: 12/344,280

(22) Filed: Dec. 25, 2008

(65) Prior Publication Data

US 2009/0101743 A1  Apr. 23, 2009

Related U.S. Application Data

(63) Continuation-in-part of application No. 11/843,653, filed on Aug. 23, 2007, now abandoned.

(51) Int. Cl.
*B65H 75/48* (2006.01)

(52) U.S. Cl. .............. 242/378.1; 242/378.2; 242/378.3; 242/378.4

(58) Field of Classification Search .................. 242/378, 242/378.1–378.4
See application file for complete search history.

(56) References Cited

U.S. PATENT DOCUMENTS

| 6,736,346 | B1 * | 5/2004 | Park .......................... 242/378.1 |
| 7,222,811 | B2 * | 5/2007 | Chang ....................... 242/378.1 |
| 7,222,812 | B2 * | 5/2007 | Chang et al. .............. 242/378.1 |
| 7,490,791 | B1 * | 2/2009 | Yen ........................... 242/378.1 |

* cited by examiner

*Primary Examiner*—Sang Kim
(74) *Attorney, Agent, or Firm*—Leong C. Lei

(57) ABSTRACT

A single-pull reel which includes a bottom cover having a center axle, a top cover engageable with the bottom cover; a cord-rotating disc having a top portion provided with a circular flange which is divided into a plurality of sections by a plurality of slots, a clamping member being provided behind one of the sections to form a passage therebetween and having a plurality of serrated teeth at an inner side against the one of the sections, the bottom portion being provided with a multi-operation urging track, a spiral spring having an inner end engaged with a notch of the axle and an outer end bent into a hook to engage with one of the sections of the cord-rotating disc, a cord, and a peg positioning structure comprising a peg and a pulling spring.

3 Claims, 9 Drawing Sheets

STRUCTURE OF A SINGLE-PULL REEL

CROSS-REFERENCE

This is a continuation-in-part of the pending patent application Ser. No. 11/843,653 filed, Aug. 23, 2007, now abandoned.

BACKGROUND OF THE INVENTION (a) Technical Field of the Invention

The present invention is related to an improvement in the structure of a single-pull reel.

(b) Description of the Prior Art

FIGS. 12 and 13 show a conventional reel A10 employing a steel bead as the positioning structure. The reel A10 comprises a front cover A1, a spiral spring A2, a sliding seat A3, a transmission line A4, a steel bead A5 and a rear cover A6. In this conventional reel, the spring A2 is used to restore the transmission line A4 and a steel bead positioning structure is used. A multiple steel bead track A31 is provided at the bottom section of the sliding seat A3 to allow the steel bead A5 to roll along the track A31 and to engage. The designing of the track for the steel bead is difficult with respect to precision and the producing of a mold is laborious. Thus, the yield of the assembly will not be improved, and the cost of production will be increased.

Another drawback is that the friction of the track 31 or the gap formed is too large, this will cause the engagement being not possible. Thus, such conventional structure A10 is commonly not functioning or failure in engagement. Further, the transmission line cannot be gradually restored and positioned, and the accuracy of positioning at the track of the sliding seat is limited.

SUMMARY OF THE INVENTION

The primary purpose of the present invention is to provide a positioning peg structure of a single-pull reel having a top cover, a cord-rotating disc, a cord, a spiral spring, a bottom cover and a peg positioning structure characterized in that the cord is wound respectively within an upper and a lower box of the cord-rotating disc, and both the windings in the upper and the lower box are in opposite direction to provide a loosening and a tightening winding of the cord, the upper box position is for the pulling cord and the lower box position is for the ready-to-rotate cord and the positioning of the cord is restricted by the peg positioning structure; wherein the peg positioning structure comprises a peg and a spring and is pivotally mounted at a positioning shaft located at the outer side of the interior of the bottom cover and the rear side of the positioning structure is pulled to close by the spring to constantly maintain the peg to point at a right direction and is urged to swing in accordance with the track for multi-operation function at the bottom section of the cord disc to proceed alternately with loosening and tightening operation, and the track includes a first push-to-close section, a second push-to-close section, a steering section, an engaging slot and a slanting leading face multi operation structure, wherein the first push-to-close section is a protruded section within the track; when the cord-rotating disc restores to the steering direction, the peg is pushed to large angle in clockwise and the peg is fully disengaged from engagement mechanism; the second push-to-close section is positioned at the rear direction of the first push-to-close section, which again pushes the peg to a larger angle clockwise to disengage from engagement mechanism; the steering section is the recess section of the track, when the cord-rotating disc is at clockwise rotation, the peg is rotated and restored to engage at a corner position, awaiting an engagement mechanism in the course of a reverse rotating; the engaging slot is mounted at the rear direction of the first push-to-close section to allow the peg, after a rotation, to be engaged so as to position the reel; and the slanting leading face, which directs peg into the engaging slot layer or the push-to-close layer during the clockwise and anti-clockwise rotation of the cord-rotating disc to allow the peg to accurately position at the engaging or disengaging mechanism.

Yet still another object of the present invention is to provide a positioning peg structure of a single-pull reel, wherein the positioning is trackless and disengagement of the cord will not be occurred.

The advantages of the present invention are

1. The apparatus provides a convenient mechanism in installation of cord or cables and the clean-up of cable after installation.

2. The required length of the cord can be easily and precisely positioned after a specific length is pulled.

3. Multiple positioning of cord is possible and high precision of length to be positioned can be achieved using the apparatus of the present invention.

4. The apparatus provides a fast and easy operation such that the restoration of the cord can be obtained gradually or at one operation.

5. The apparatus of the present invention overcomes the drawbacks due to wears and the gap formed by the steel bead and the sliding seat.

6. The installation of the apparatus of the present invention is simple, fast and convenient, and the yield is thus increased.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
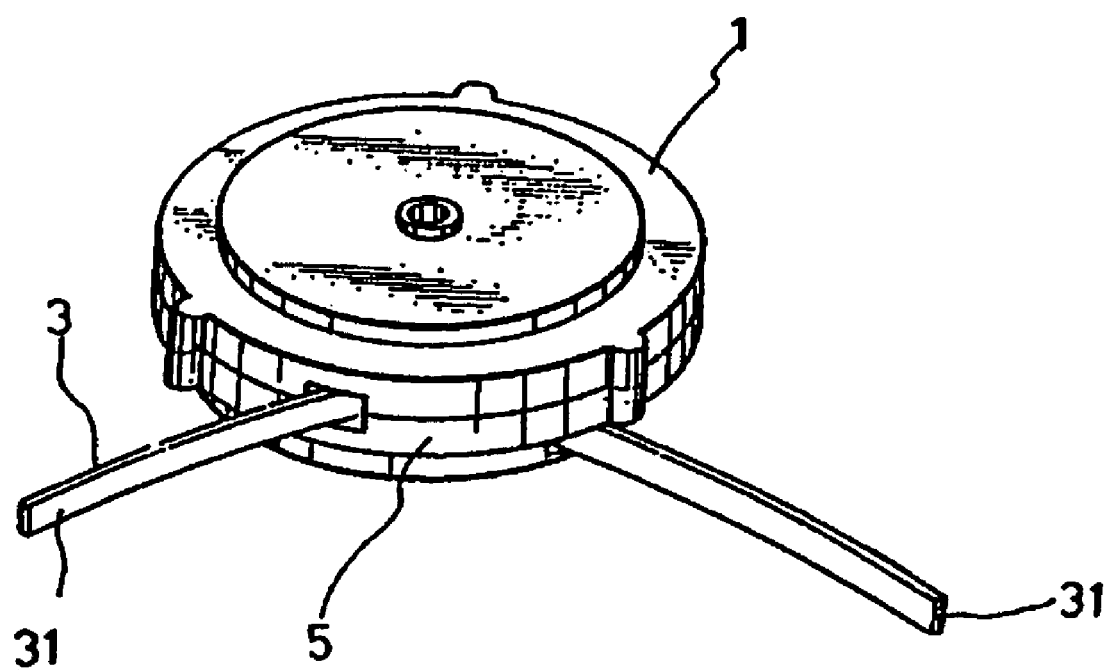
FIG. 1 is a perspective view of the preferred embodiment of the present invention.
Figure 2:
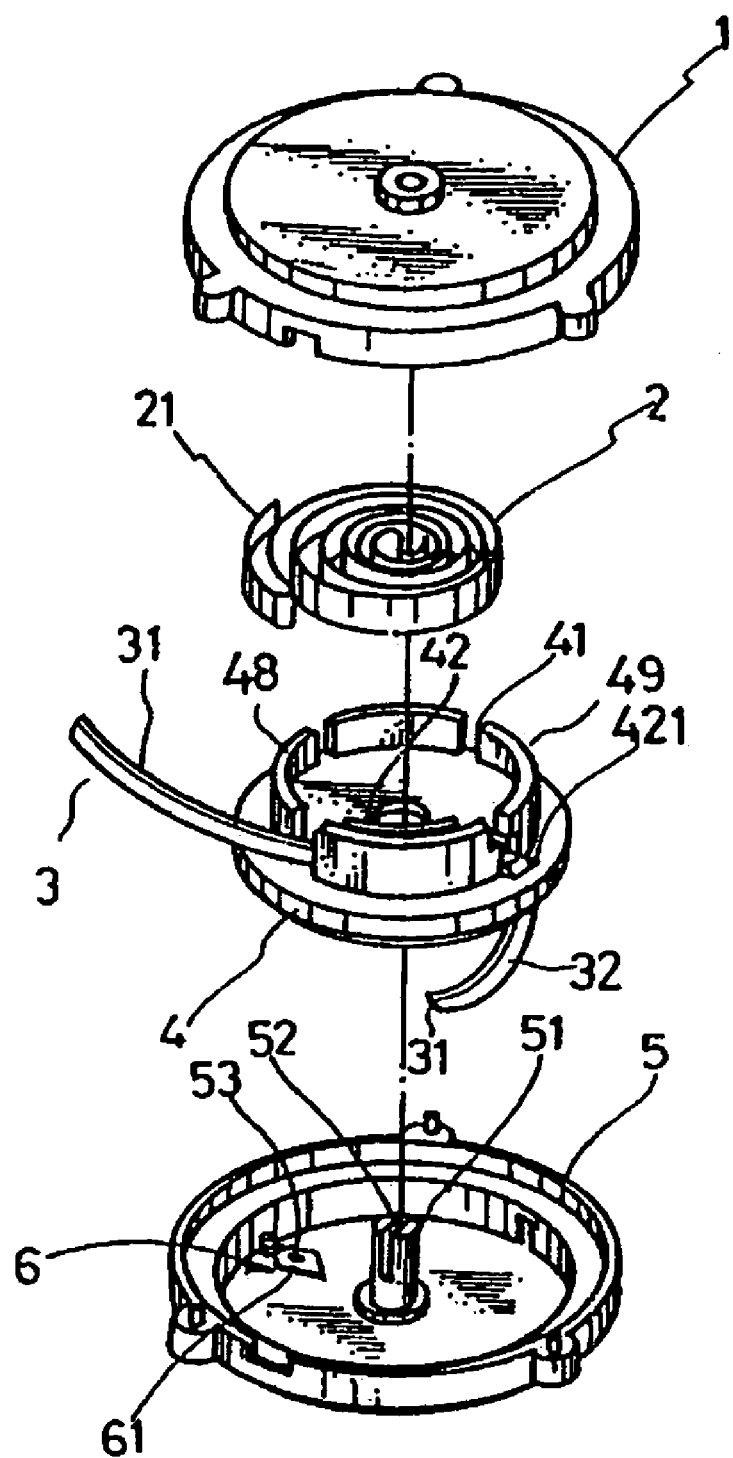
FIG. 2 is a perspective exploded view of the present invention.
Figure 3:
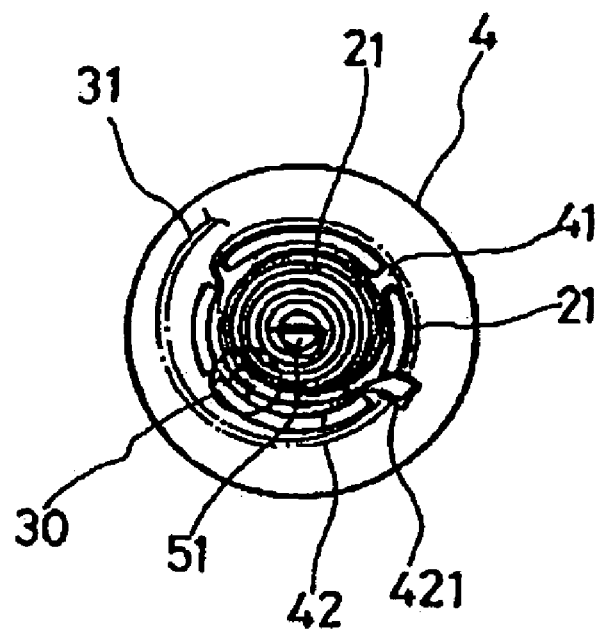
FIG. 3 illustrates the engagement of the spiral spring and the cord-rotating disc.
Figure 4:
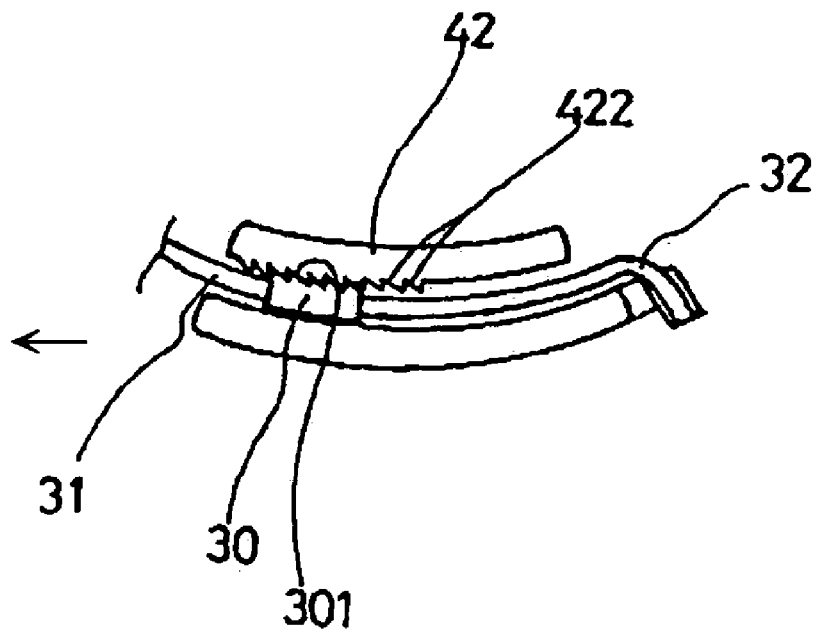
FIG. 4 is an enlarged view of a portion of FIG. 3.
Figure 5:
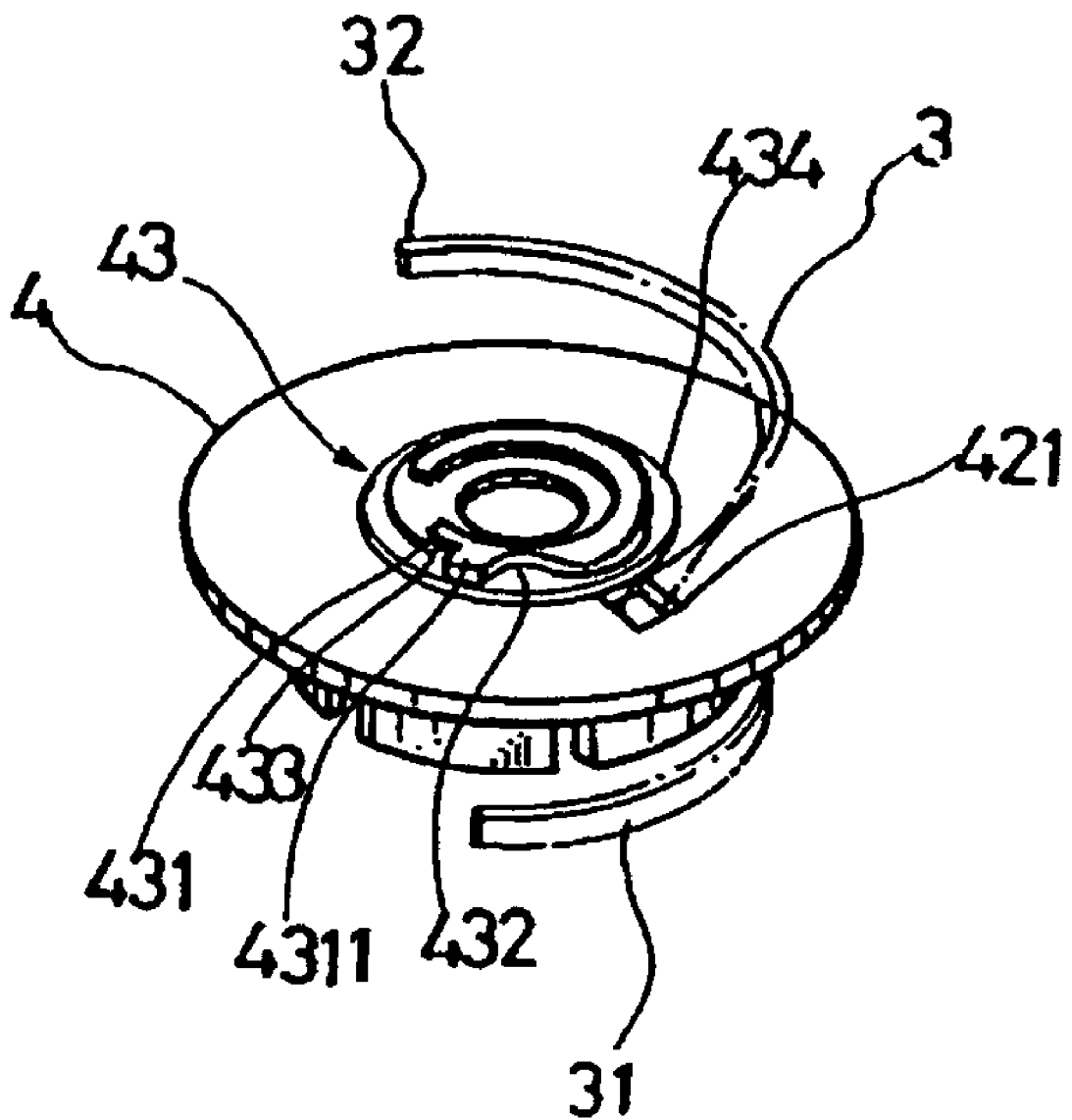
FIG. 5 is a perspective view showing the bottom structure of the cord-rotating disc.

Referring to FIGS. 1, 2 and 3, the single-pull reel according to the present invention generally comprises a top cover 1, a spiral spring 2, a cord 3, a cord-rotating disc 4, a bottom cover 5 and a peg positioning structure 6. The bottom cover 5 is provided at the center with an axle 51 which has a notch 52 at the top end. The top cover 1 is configured to engage with the bottom cover 5. The inner end of the spiral spring 2 is in engagement with the engaging slot 52 of the axle 51 within the interior of the bottom cover 5. The cord-rotating disc 4 is provided at the top portion with a circular flange 49 which is divided into a plurality of sections 48 by a plurality of slots 41. A clamping member 42 is provided on the top portion of cord-rotating disc 4 behind a section 48 to form a passage therebetween and has a plurality of serrated teeth 422 at the inner side against the section 48. The outer end of the spiral spring 2 is bent into a hook 21 to engage with one of the sections 48. When the cord-rotating disc 4 is rotated in clockwise or counter-clockwise direction, the spiral spring 2 will be tightened or loosened. The cord 3 is provided with an enlarged block 30 which divides the cord 3 into a first section 31 and a second section 32. The enlarged block 30 has a plurality of serrated teeth 301 engaged with the serrated teeth 422 of the clamping member 42, so that once the enlarged block 30 of the cord 3 is pushed to engage with the clamping member 42 in assembly, the enlarged block 30 cannot be pulled out of the clamping member 42. The first section 31 of the cord 3 is wound around the circular flange 49 of the cord-rotating disc 4. Referring to FIGS. 2 and 5, the second section 32 of the cord 3 extends out of the hole 421 of the cord-rotating disc 4 from the top portion to the bottom portion to connect with any desired connector (not shown).

Figure 6:
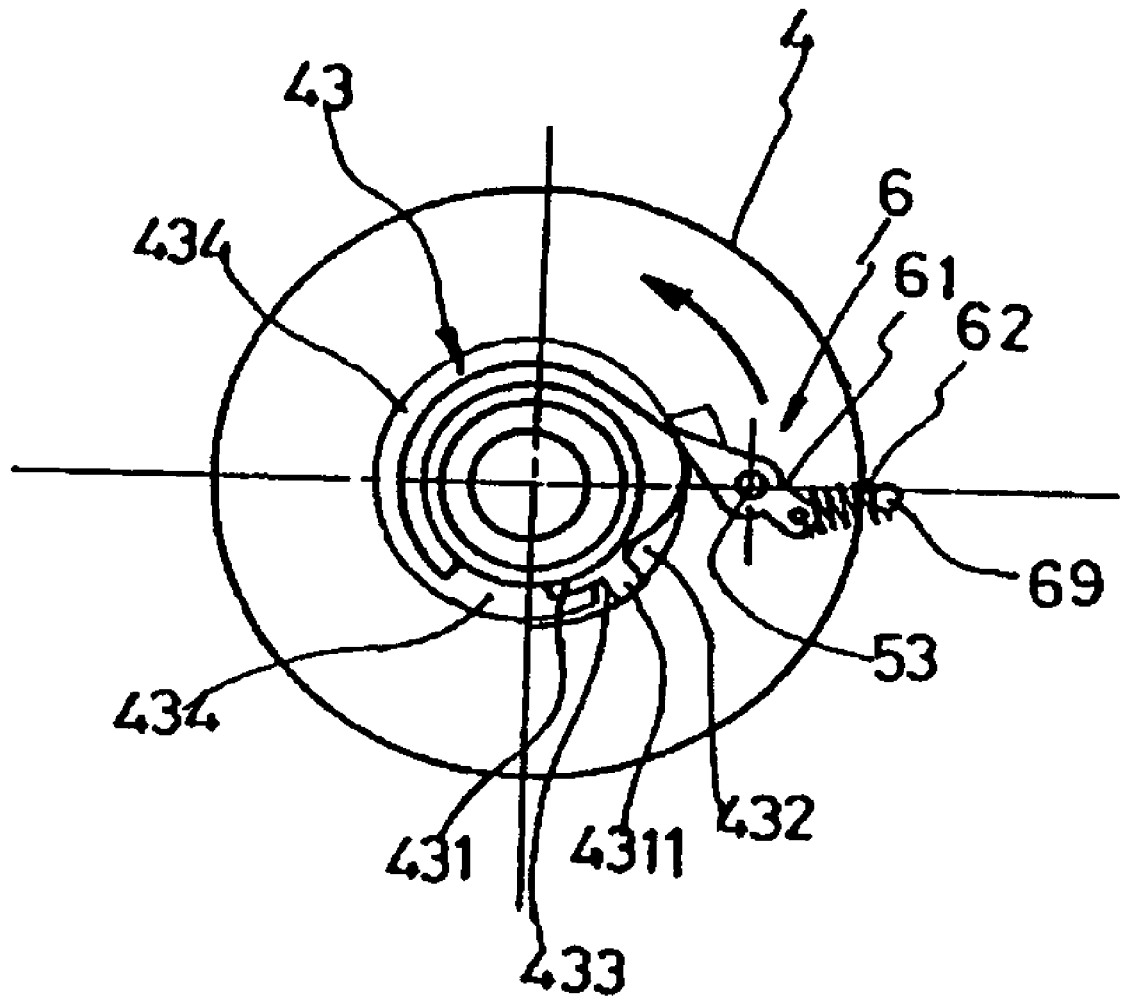
FIGS. 6, 7, 8, 9, 10 and 11 show schematically the structure of the track of the cord-rotating disc and the positioning structure in accordance with present invention.

Referring to FIGS. 2 and 6, the peg positioning structure 6 comprises a peg 61 and a pulling spring 62. The peg 61 is pivotally mounted on a shaft 53 arranged on the bottom cover 5. The pulling spring 62 has an end fixed to a pin 69 arranged on the bottom cover 5 and the other end connected to an end of the peg 61 thereby forcing the peg 61 to point to a desired direction.

Referring to FIGS. 5 and 6, the bottom portion of the cord-rotating disc 4 is provided with a multi-operation urging track 43. The track 43 includes a first push-to-close section 431, a second push-to-close section 4311, a steering section 432, an engaging slot 433 and a slanting leading face 434. As shown in FIG. 6, the peg 61 is slanting upward and so when the first section 31 of the cord 3 is pulled along the direction shown in FIG. 6, there will be no engaging operation.

Figure 7:
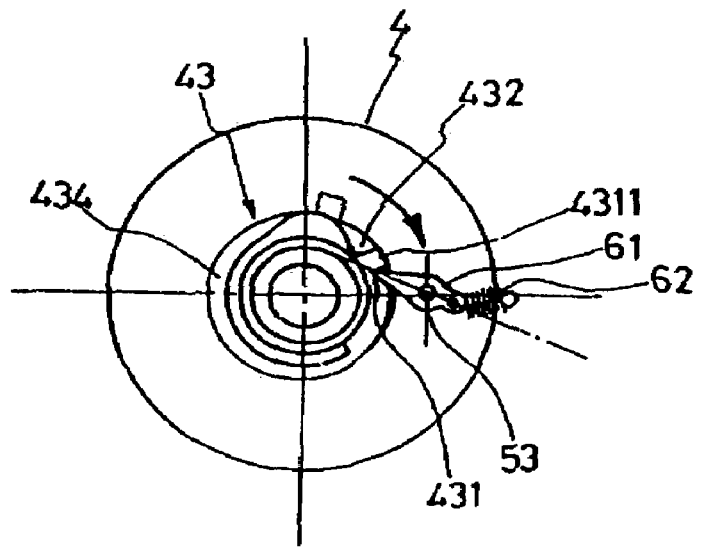

Referring to FIG. 7, when the first section 31 of the cord 3 is released, the restoration force of the spiral spring 2 will cause the cord-rotating disc 4 to rotate in a reverse direction and the peg 61 will be directed to the engaging slot 433 of the track 43 thereby stopping the cord-rotating disc 4 to rotate further. The peg 61 is directed at a tangential angle to the track 43 and so the peg 61 is fully engaged and swinging will not occur thereby achieving the purpose of positioning of the reel.

Figure 8:
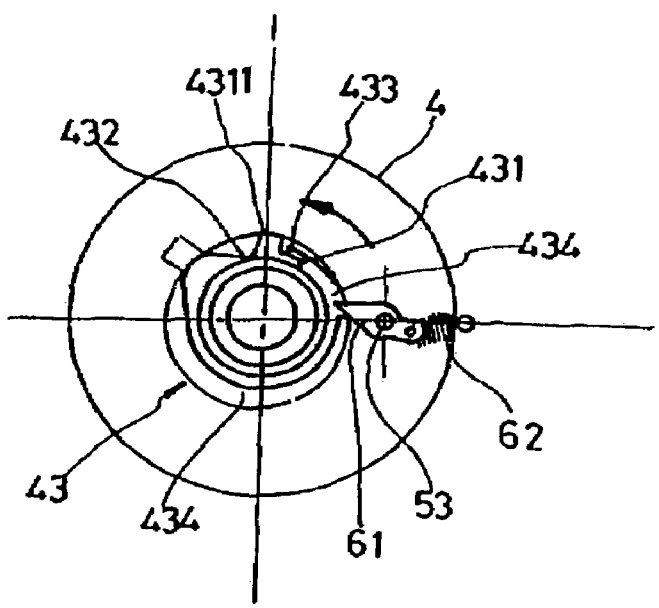
Figure 9:
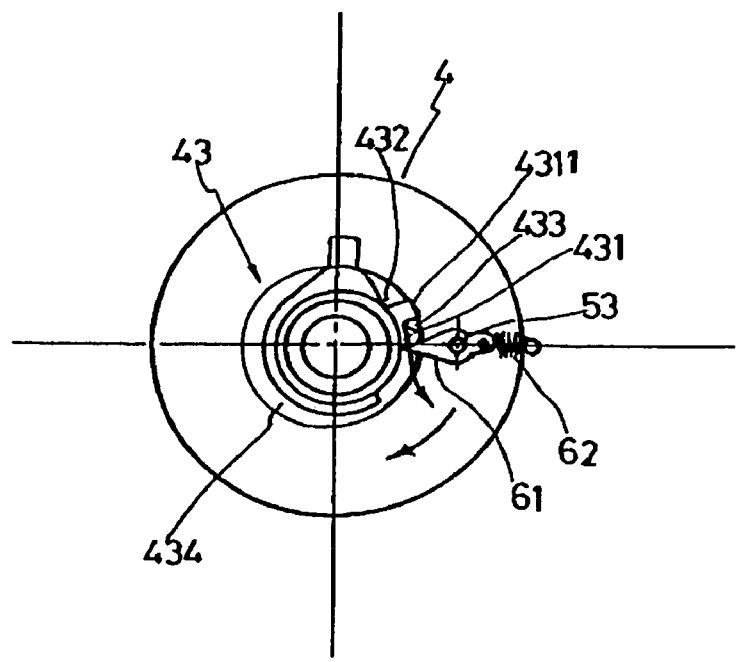
Figure 10:
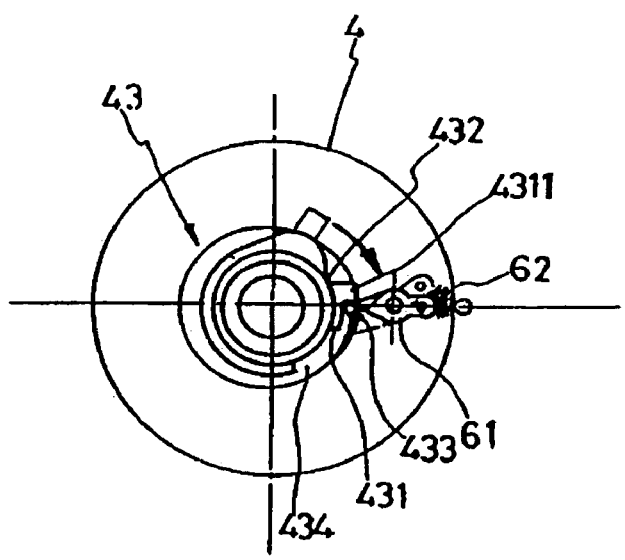

As shown in FIG. 8, when desired to release the peg 61, it is only necessary to pull the first section 31 of the cord 3 to rotate the cord-rotating disc 4 in counterclockwise direction. The reverse rotating of the cord-rotating disc 4 causes the peg 61 to move along the slanting leading face 434 into the range of the push-to-close section 431 so as to quickly push the peg 61 to rotate, as shown in FIG. 9. After that, the second push-to-close section 4311 causes the peg 61 to produce a large angle and moves into the range of the steering section 432, as shown in FIG. 10. At this point of time, the reel is at a loosening state. Thus, the cord 3 can one time pulls back the cord 3 by means of the restoring force of the spiral spring 2.

Figure 11:
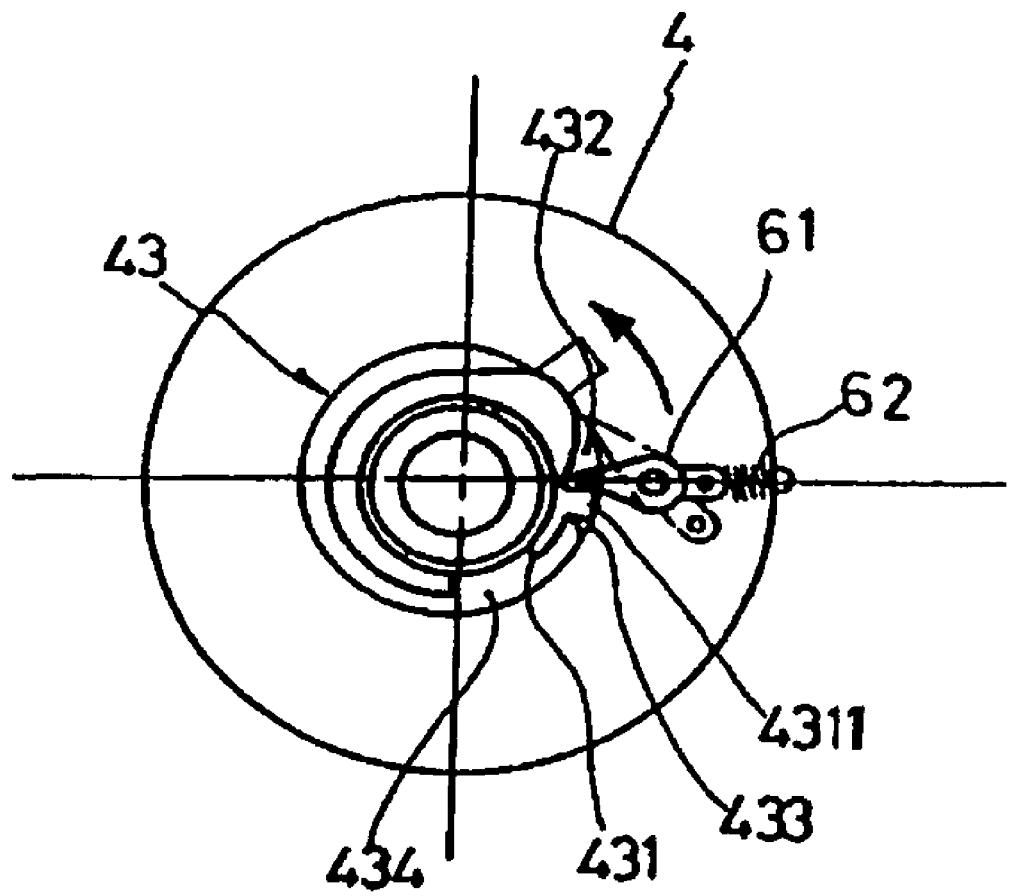
Figure 12:
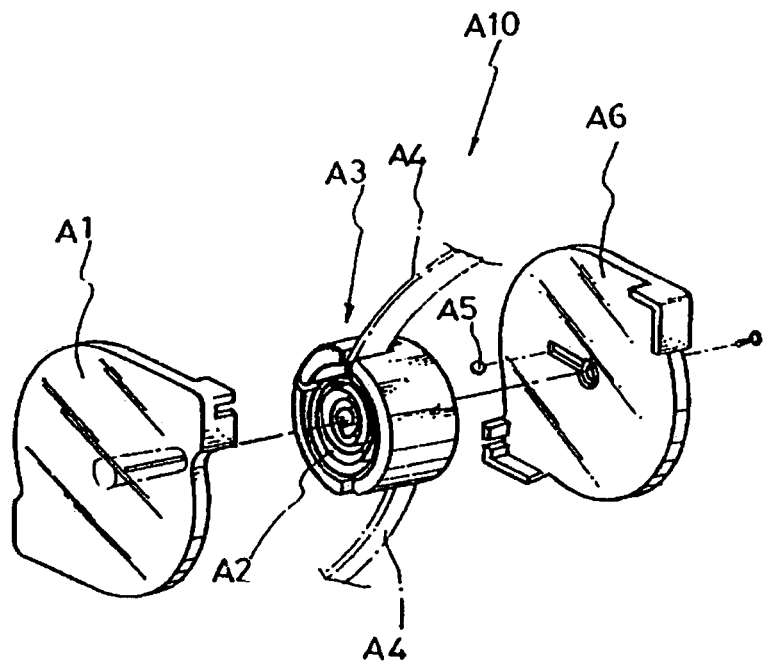
FIG. 12 is an exploded view of a conventional reel using the steel bead as positioning structure.
Figure 13:
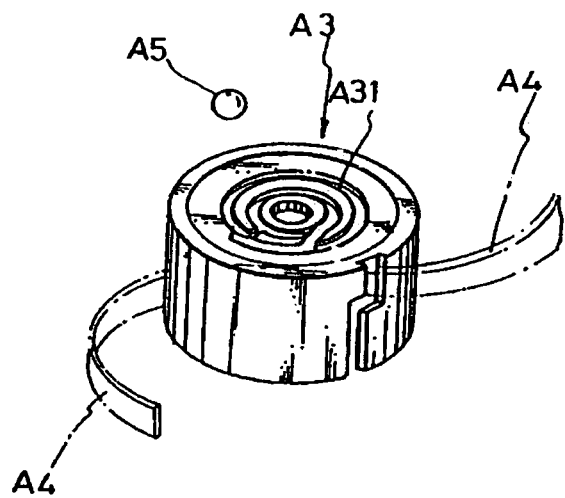
FIG. 13 is a schematic view showing the bottom section of the sliding seat of the conventional reel using the steel bead as positioning structure.

Referring to FIG. 11, the cord 3 is eventually reeling back or re-positioned. Before the cord 3 is positioned, the next pulling of the cord 3 will again rotate the cord-rotating disc 4 in a reverse direction. At this point of time, the peg 61 being restricted by the steering section 432 urging on the peg 61, the peg 61 is at a state shown in FIGS. 6 and 7, awaiting the reverse rotating to cause an engagement at the engaging slot 433.

The second section 32 of the cord 3 at the bottom portion of the cord-rotating disc 4 is at a tightening state under a single directional pulling of the cord 3, so as to respond to the required length of the rotation. On the other hand, when the cord 3 is restored to its original position, the second section 32 of the cord 3 at the bottom portion of the cord-rotating disc 4 is at a loosening position, thus, both of the operation are corresponding to each other. Thus, the reel under a single cord could achieve the function of a single-pull cord, and will not affect the terminal or signal transmission point required by the second section 32 of the cord 3.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A single-pull reel comprising:
   a bottom cover having a center provided with an axle, said axle having a top end provided with a notch;
   a top cover configured to engage with said bottom cover;
   a cord-rotating disc having a top portion and a bottom portion, said top portion being provided with a circular flange which is divided into a plurality of sections by a plurality of slots, a clamping member being provided on said top portion of said cord-rotating disc to form a passage between said clamping member and one of said sections and having an engaging means at an inner side against said one of said sections, said bottom portion being provided with a multi-operation urging track which includes a first push-to-close section, a second push-to-close section, a steering section, a engaging slot and a slanting leading face;
   a spiral spring having an inner end and an outer end, said inner end being engaged with said notch of said axle, said outer end being bent into a hook to engage with one of said sections of said cord-rotating disc;

a cord divided into a first section and a second section by an enlarged block, said block having an engaging means engaged with said engaging means of said clamping member, said first section of said cord being wound around said first flange of said cord-rotating disc, said second section of said cord extending out of a hole from said top portion of said cord-rotating disc to said bottom portion of said cord-rotating disc;

a peg positioning structure comprising a peg and a pulling spring, said peg being pivotally mounted on a shaft arranged on said bottom cover, said pulling spring having an end fixed to a pin arranged on said bottom cover and another end connected to an end of said peg thereby forcing said peg to point to a predetermined direction;

whereby when said reel is released, said spiral spring will restore power and said cord-rotating disc will rotate in a reverse direction and then said peg will move along said track to engage with said first engaging slot of said cord-rotating disc thereby providing a positioning effect to said reel; when desired to disengage said peg from said first engaging slot of said cord-rotating disc, it is only necessary to pull said cord to rotate said cord-rotating disc thereby causing said peg to move along said slanting leading face of said cord-rotating disc into a range of said first push-to-close section so as to quickly push said peg to rotate, and then said second push-to-close section will cause said peg to move into a range of said steering section thereby causing said reel at a loosening state.

2. The single-pull reel as claimed in claim 1, wherein said engaging means of said clamping member includes first serrated teeth, and said engaging means of said block includes second serrated teeth engageable with said first serrated teeth.

3. The single-pull reel as claimed in claim 1, wherein said clamping member is arranged behind said one of said sections.

* * * * *